United States Patent [19]

Woronowicz

[11] 4,085,770
[45] Apr. 25, 1978

[54] SEAT AND TRUNNION ASSEMBLIES FOR ROTARY VALVES

[76] Inventor: Romuald Woronowicz, 13324-126 Avenue, Edmonton, Alberta, Canada, T5L 3E1

[21] Appl. No.: 678,925

[22] Filed: Apr. 21, 1976

[30] Foreign Application Priority Data

Dec. 5, 1975   Canada .................. 241168

[51] Int. Cl.² .......................... F16K 5/20; F16K 5/22
[52] U.S. Cl. ................... 137/238; 137/246.22; 251/174; 251/286; 251/315
[58] Field of Search .............. 251/172, 174, 286, 287, 251/314–317; 137/237, 238, 246.22

[56] References Cited

U.S. PATENT DOCUMENTS

| | | | |
|---|---|---|---|
| 3,181,834 | 5/1965 | Jennings et al. | 251/172 |
| 3,416,558 | 12/1968 | Works | 137/246.22 |
| 3,552,717 | 1/1971 | Oliver | 251/285 |
| 3,776,506 | 12/1973 | Fowler et al. | 251/172 |

FOREIGN PATENT DOCUMENTS 206,699   12/1959   Austria .................. 251/317

*Primary Examiner*—Martin P. Schwadron
*Assistant Examiner*—Richard Gerard

*Attorney, Agent, or Firm*—Burns, Doane, Swecker & Mathis

[57] ABSTRACT

A plug valve is disclosed having a valve chamber with inlet and outlet flow passages in fluid communication therewith, at least one of the flow passages having a generally cylindrical seat recess formed therein about the flow passage and an axially movable seat assembly disposed therein. The valve includes improved means for biasing the sealing assembly against the plug member and cleaning the space between the sealing assembly and the valve body, namely a plurality of conduits extending from the interior surface of a flow passage to a shoulder surface of its associated seat recess and providing for fluid communication between those surfaces.

In the preferred embodiment of this invention, wherein the plug is spherical and rotatably mounted on upper and lower trunnions, the lower end of the lower trunnion is mounted in a trunnion cap, and a limit stop is incorporated therein comprising trunnion. A novel sealing assembly is disclosed for use in the preferred embodiment, including a seat ring and overfitting retainer ring defining an annular groove, an elastomeric sealing element being tightly held therein under radial and axial compression and projecting through an opening in the groove to contact the plug in sealing engagement therewith.

28 Claims, 17 Drawing Figures

SEAT AND TRUNNION ASSEMBLIES FOR ROTARY VALVES

BACKGROUND OF THE INVENTION

1. Field of the Invention

This invention relates generally to plug valves for controlling fluid flow and more particularly to trunnioned ball valves designed to operate under a wide range of temperature and pressure conditions, including conditions of high pressure, and utilizing sealing means incorporating elastomeric materials. The valves of this invention include axially movable sealing assemblies mounted in seat recesses formed within the inlet and outlet flow passages adjacent to the plug member. The valves disclosed herein may be used in oil and gas pipelines, and in refinery, chemical, nuclear, compressor and other industrial installations.

2. Description of the Prior Art

Gate and ball valves incorporating axially movable sealing assemblies with elastomeric sealing elements made of materials such as rubber, polytetrafluoroethylene ("TEFLON" — Trade Mark of E. I. duPont de Nemours and Co.) or a fully saturated fluorocarbon copolymer of chlorotrifluoroethylene and vinylidene fluoride ("KEL-F" — Trade Mark of M. W. Kellogg Company) are known in the prior art. See, for example, Canadian Patent No. 801,600, W. E. Lowrey, issued Dec. 17, 1968. It is known to design the sealing assemblies for such valves in such a way that, where the pressure within the conduit exceeds that within the valve chamber, the pressure on the side of the sealing assembly remote from the plug member substantially exceeds that on the side adjacent to the plug member whereby the sealing assembly is forced into tight sealing engagement with the plug. See, for example, U.S. Pat. No. 3,460,802, J. M. Colby et al, Aug. 12, 1969. Colby also discloses bevelling of the inlet and outlet flow passages behind the shoulder of the seat assembly so as to provide, when the valve is in the open position, a turbulent flow that scours out debris or particles which may have become lodged behind the shoulders when the valve was closed. Lowrey, supra, also discloses the use of a spring means to bias the seat assembly against the plug member when there is no flow and the pressure within the conduit does not exceed that within the valve chamber outside the line of sealing contact between the sealing member and the plug member. It is known, in such valves, to utilize a sealing assembly comprising a seat ring and a retainer ring interfitting to define an annular groove, with an annular elastomeric sealing member held within that groove under pressure and brought to bear against the plug member in sealing engagement. See Lowrey, supra, and also Canadian Patent No. 825,032, E. R. Atkinson et al, Oct. 14, 1969. It is further known in such valves to provide means for introducing lubricant sealant to the area of sealing contact between the sealing member and the plug member; see, for example, Canadian Patent No. 830,323, M. T. Works, Dec. 23, 1969. Finally, it is known, in trunnioned ball valves, to provide stop means at the lowermost end of the lower trunnion for limiting the rotation of the plug member to a range of 90° between the open and closed positions in order to facilitate the precise positioning of the plug member in the conditions of zero flow and maximum flow. See, for example, Canadian Patent Nos. 911,973 and 921,451, A. D. Oliver, Oct. 10, 1972 and Feb. 20, 1973 respectively. By positioning a stop device in the lower trunnion, it is possible to avoid misalignment caused by stresses encountered during use of the valve, and it is possible to provide precise initial alignment in spite of "tolerance stackup" due to manufacturing tolerances in the various parts of the valve.

SUMMARY OF THE INVENTION

This invention comprises an improved plug valve of the general type discussed above. The valve of this invention is a plug valve, preferably a spherical plug valve, including inlet and outlet flow passages in fluid communication with the valve chamber and axially movable sealing assemblies mounted within generally cylindrical seat recesses formed in the valve body about the flow passages adjacent to the valve chamber, wherein a plurality of fluid conduits extend from the interior surface of the flow passage to the seat recess shoulder adjacent to the shoulder of a seat assembly. When the valve is in the open position, fluid from a flow passage on the upstream side of the plug flows through the conduits and is directed against the shoulder of the upstream seat assembly, thereby providing a velocity head supplementing the static pressure head forcing the seat assembly against the plug. In addition, a turbulent flow is thereby created within the space between the seat recess shoulder and the seat assembly shoulder, flushing out accumulated debris or other matter and preventing the seat assembly from "seizing up". Valve life is extended and "down time" for servicing, particularly cleaning, is reduced. The action of the conduits disclosed herein has advantages over that of the bevelled flow passages of the prior art.

In addition, the spherical plug valve of the preferred embodiment of this invention incorporates a novel trunnion stop provided by a cylindrical cap and trunnion bearing having a projection that co-operates with a recess in the trunnion so as to limit trunnion rotation to a range of 90° between the open and closed positions of the plug member.

Finally, the spherical plug valve of the preferred embodiment of this invention includes a seat assembly comprising a seat ring, a retainer ring fitted over the seat ring and defining therewith an annular groove with a reduced annular opening adjacent the plug memer. A sealing element, usually elastomeric, is disposed within the groove with an annular portion thereof projecting through the reduced annular opening in sealing engagement with the plug member. The annular groove is defined by a recess in the seat ring partially closed off by an inwardly extending retainer ring lip having a curved inner surface which forms one of the surfaces of the groove. The sealing element is axially shorter and radially thicker than the groove so that it is compressed into the recess when the retainer ring is applied. Under lower pressures, a space is left at the end of the recess remote from the plug member to allow for further compression of the sealing member into the groove as pressure increases.

DESCRIPTION OF THE DRAWINGS

In the drawings which illustrate the preferred embodiment of the invention.

Figure 1:
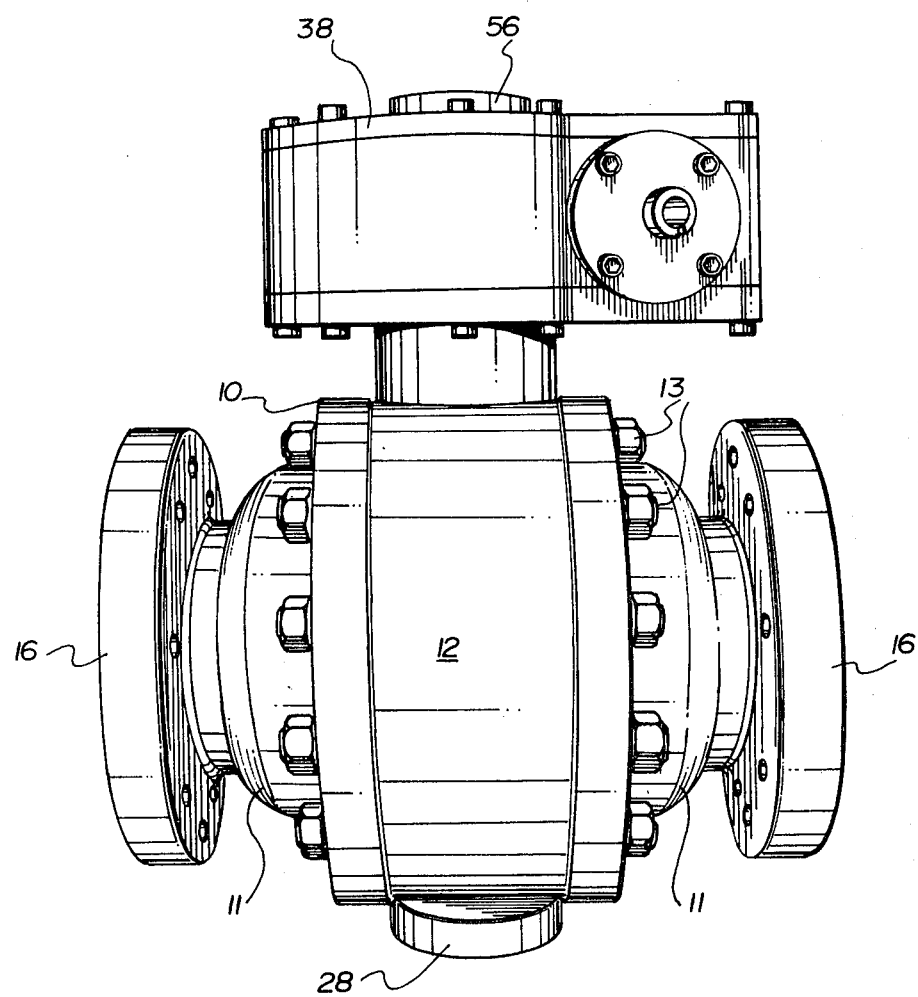
FIG. 1 is an elevation of the preferred embodiment of this invention.

The preferred embodiment of this invention, as depicted in the drawings, is a trunnioned ball valve. However, the conduits of this invention might be utilized in any valve, ball or gate, in which an axially movable sealing assembly is mounted within a seat recess in the inlet and/or outlet passages, and in which debris may accumulate in the space between the sealing assembly and a radially outwardly extending shoulder of the passage.

Figure 2:
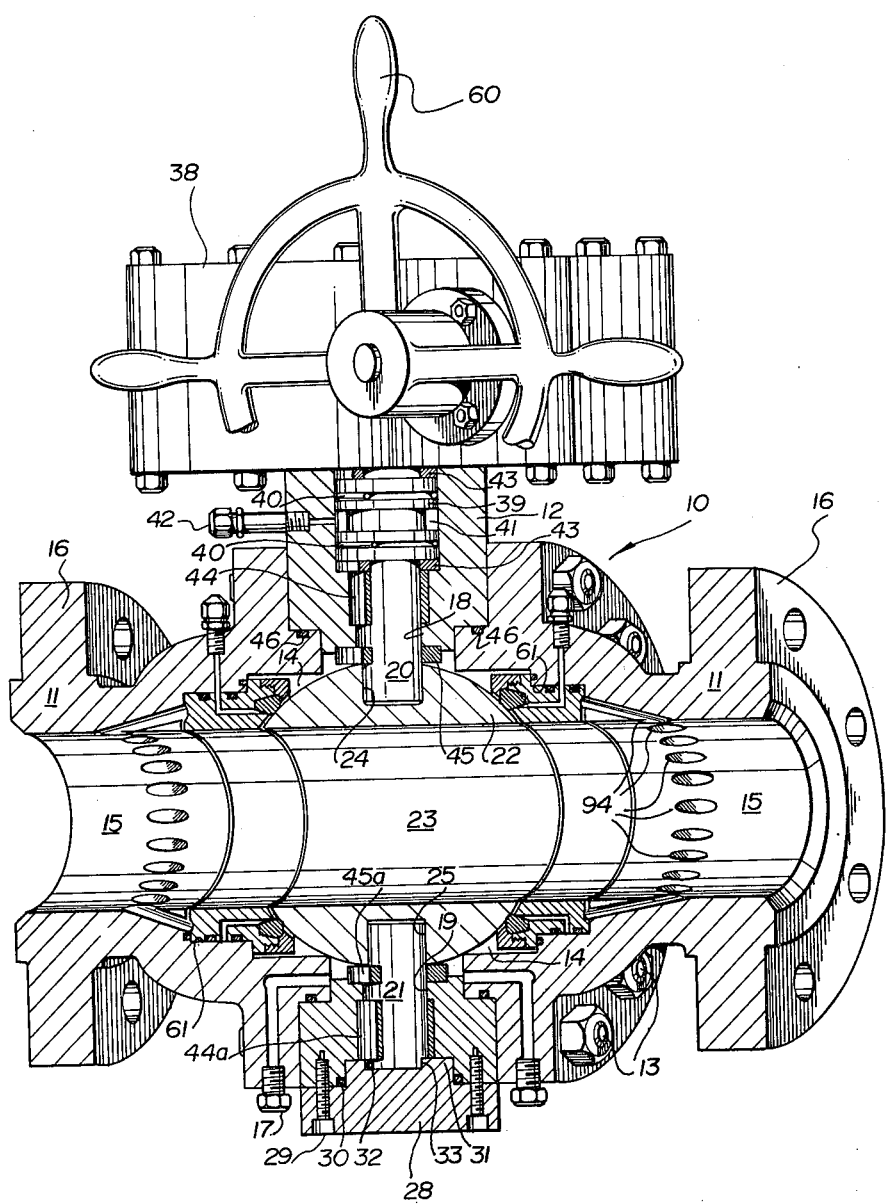
FIG. 2 is a similar elevation, but partly in section, to that of FIG. 1, taken from a point slightly to the right of the point of view of FIG. 1.

Referring to the drawings which depict the preferred embodiment of this invention, a trunnioned end entry spherical plug valve, or ball valve, is indicated generally by reference numeral 10 in FIGS. 1 and 2. For clarity FIG. 1 omits the handle of the worm used to operate the valve. In FIG. 2, the handle is partly cut away. The valve 10 has a valve body made up of two identical body end members 11 and a central body member 12, joined to each other by bolts or threaded studs 13 to define a valve chamber 14. The body portion of the valve 10 is formed with flow passages 15 in fluid communication with the valve chamber 14. Flow passages 15 may serve interchangeably as inlet or outlet passages. The valve body may be provided with flanges 16 as shown in FIGS. 1 and 2, or it may be provided with other means for bolted, welded or threaded connection of valve 10 in a pipeline or other fluid conduit. Other conventional methods of connecting the valve 10 in a pipeline, or other fluid conduit, may be employed.

In the drawings, each of the valve body end members is provided with a body drain fitting 17 for draining or bleeding fluids from the valve chamber 14. However, only one such drain fitting is necessary.

Figure 11:
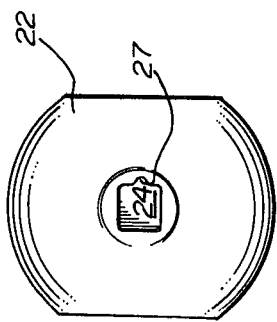
FIG. 11 is a top plan view of the spherical plug member.
Figure 15:
FIG. 15 is a side plan view of the lower trunnion.
Figure 12:
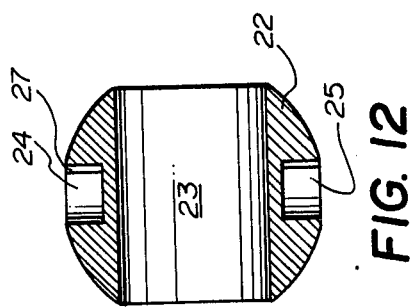
FIG. 12 is a median section of the spherical plug member.
Figure 14:
FIG. 14 is a plan view of the lower end of the lower trunnion.

The central valve body portion 12 is formed with aligned upper and lower bores 18 and 19, respectively, which receive upper and lower trunnions 20 and 21, respectively. A spherical plug member 22 having a flow passage 23 formed in it is rotatably positioned within the valve chamber 14 and is provided with oppositely disposed upper and lower recesses 24 and 25 which receive the inner ends of the trunnions 20 and 21. The plug member 22 is maintained in non-rotatable relationship with the trunnions 20 and 21 by virtue of the special cross-sectional configuration of the inner ends of the trunnions as best illustrated in FIGS. 14 and 15 (which depict lower trunnion 21; both trunnions are identical in respect of the configuration of their inner ends, although not in other respects) and a correspondingly shaped configuration of the plug member recesses 24 and 25, as best illustrated in FIG. 11. The inner end of each trunnion is cut away to provide a generally square cross-sectional configuration, with rounded corners and a projection 26 on one face thereof, and interfits precisely within a similarly shaped plug member recess 24 and 25, one face of which has a notch 27 adapted to receive trunnion projection 26, thereby precisely aligning the trunnion 20 or 21 within the plug member 22 in a non-rotatable relation. Other non-rotatable configurations, or other means well know in the art, such as pins fitting within mating bores in the trunnions and plug, may also be used to secure the trunnions 20 and 21 in non-rotatable relation with the plug 22.

Figure 13:
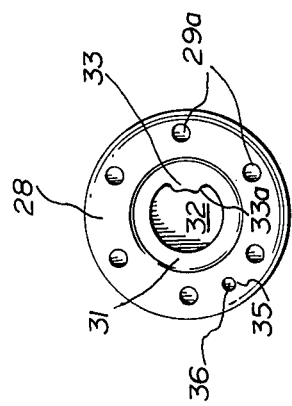
FIG. 13 is a top plan view of the lower trunnion cap.

As shown in FIGS. 2 and 13, the lower trunnion 21 is secured at its outer extremity by a trunnion retaining cap 28 attached to body portion 12 by means of screws 29, or other functionally equivalent means.

Figure 17:
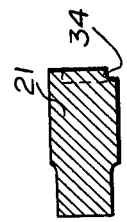
FIG. 17 is a median longitudinal section of the lower trunnion.
Figure 16:
FIG. 16 is a plan view of the lower end of the lower trunnion.

Trunnion retaining cap o-ring 30 seals the interface between trunnion cap 28 and valve body member 12. Trunnion cap 28 is provided with an upwardly extending cylindrical flange 31 within which is disposed a generally cylindrical recess 32 for receiving the lower end of trunnion 21. Within recess 32 is provided a radially inwardly directed cap projection 33, which, in combination with a recess 34 on the lower end of trunnion 21 (see FIGS. 15-17), said recess having a radial depth substantially equal to the radial thickness of said projecting portion 33, provides a limit stop, limiting the rotation of plug 22 to a range of substantially 90° between the open and closed positions of the plug. The angle subtended at the center of the cylindrical recess 32 by the projection 33 is 90° less than the angle subtended at the center of the trunnion by trunnion recess 34. In the embodiment illustrated in the FIGURES, trunnion recess 34 subtends an angle of 150° at the center of the trunnion, while cap projection 33 subtends an angle of 60° at the center of cap recess 32. (When the trunnion is mounted in the cap, their respective centers coincide.) When the valve is assembled, cap projection 33 fits within trunnion recess 34, thereby limiting rotation of the trunnion, and thus of the plug, to a range of 90°. It will be recalled that trunnion 21 is non-rotatably mounted within plug 22, and therefore the rotational range limitation imposed on the plug 22 by the combination of the trunnion recess 32 and the trunnion cap projection 33 is a direct one, and is unaffected by any tolerances that might be built into any of the other valve components. Making the stop member (i.e., trunnion cap projection 33) integral with the trunnion cap 28 provides a structurally strong stop member that resists any shearing forces to which it may normally be exposed.

In addition, means is provided for plug alignment on initial assembly, wherein an accumulation of allowable tolerances might otherwise preclude precise positive alignment of the plug channel 23 with the flow passages 15 in the open position of the valve. This alignment means enables accounting for tolerance accumulation during assembly of the valve components in such manner as to allow pressure positioning of the cap projection 33 relative to the trunnion recess 32 upon assembly of the valve. After the alignment means has been properly installed, the rotatable plug member 22 will be positively aligned with the flow passages 15 of the valve body in the open position of the valve.

Referring particularly to FIG. 13, the valve is provided with a structure for precisely adjusting the position of cap projection 33 relative to the trunnion 21 for the purpose of overcoming any misalignment that might have occured during assembly due to accumulation of tolerances. Before the valve is assembled, the trunnion retaining cap 28 is provided with a drill guide bore 35, the trunnion retaining cap being fixed to the valve body member 12 by a series of screws 29. The apertures 29a in the trunnion retaining cap 28 are larger than the screws 29 so that the trunnion retaining cap 28 may be rotated slightly within limits defined by the clearances between the screw apertures 29a and the screws 29. During assembly, with the plug 22 precisely aligned in its fully open position, a shoulder 33a of trunnion cap projection 33 may not abut precisely the limit surface 34a of trunnion recess 34. In that event, trunnion retaining cap 28 is rotated slightly within its predetermined limits, so as to bring the aforesaid surfaces into precise engagement, while the plug member 22 is maintained in the properly aligned position. An alignment aperture is then drilled into the valve body member 12 using guide bore 35 and a guide pin or dowel 36 is inserted within the guide bore 35 and the aperture so drilled. The pin 36 may be held within the aperture and guide bore by any suitable means, such as peening the bottom portion of the trunnion retaining cap 28 about the bore 35 to retain the guide pin 36 against dislodgement. The guide pin 36 fits in tight-fitting frictional engagement with the guide bore 35 and the drilled aperture. In this manner, the trunnion retaining cap is maintained in precise alignment with the lower trunnion 21 so as to ensure precise positive alignment of the plug passage 23 with the inlet and outlet passages 15 when the plug 22 is in the fully open position.

A further advantage of the trunnion cap 28 of this invention is that flange 31 is entirely supported within valve body member 12, so that, even under conditions of high pressure differential between the upstream and downstream sides of the plug 22 of a closed or partially closed valve, no shearing forces will be exerted by trunnion 21 upon screws 29 or pin 36; rather, any such forces are taken up by the valve body member 12.

As is shown in FIG. 2, upper trunnion 20 extends upwardly into a gear housing 38. Upper trunnion 20 is provided with a radially thickened stem portion 39 including two grooves for stem o-rings 40 and a larger groove 41 comprising a packing chamber wherein semi-solid packing material such as plastic, heavy grease, or other packing sealants or other materials, as desired, may be inserted upon removal of packing fitting 42. Trunnion 20 is supported within body member 12 by upper and lower stem thrust washers 43 and stem bearing 44. A plug thrust washer 45 is interposed between plug member 22 and body member 12. (The lower trunnion is similarly supported by lower trunnion bearing 44a, and plug 22 is supported on body member 12 by lower plug thrust washer 45a.) The interface between body end members 11 and central body member 12 is sealed by o-rings 46.

Figure 10:
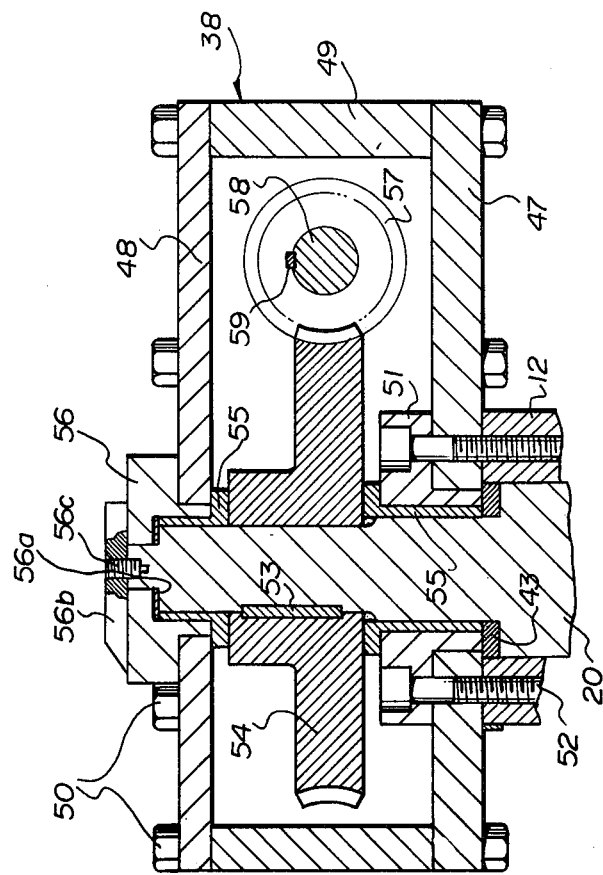
FIG. 10 is a median section of the worm, worm gear and housing thereof.

Means for holding upper trunnion 20 in place and for imparting rotary movement thereto is illustrated in FIG. 10. A gear housing, generally indicated by reference numeral 38, comprising a lower plate 47, an upper plate 48 and a circumferential plate 49, is held together by bolts 50. Housing 38 is secured to the upper surface of body portion 12 by means of gear reducer bonnet 51 which is secured to body 12 by cover bolts or screws 52, which extend through lower gear housing plate 47 into precut apertures in body 12. The combination of gear reducer bonnet 51 and housing plate 47, held in place by bolts 52 and bearing upon upper stem thrust washer 43, holds upper trunnion 20 in place in body member 12.

The upper end of trunnion 20 is of reduced diameter and is provided with a slot for receiving worm gear key 53 which holds worm gear 54 in place upon the trunnion. Worm gear 54 is supported by upper and lower worm gear shaft bearings 55. The uppermost end of trunnion 20 is supported within gear housing 38 by top bearing housing 56. Rotation is imparted to worm gear 54 by worm 57 which is coupled to worm shaft 58 by worm key 59. Worm shaft 58 is, in the embodiment illustrated, driven by the manually operated wheel 60 as shown in FIG. 2. Rotation of upper trunnion 20 by rotation of wheel 60 will, through the non-rotatable connection between trunnion 20 and spherical plug member 22, cause rotation of the plug member between its open and closed positions.

Many alternate means may be implied for imparting rotation to upper trunnion 20. For example, upper trunnion 20 may be held in place by a simple cap bolted in place to the top of body member 12, with trunnion 20 extending through the cap for attachment to a simple lever of a type well known in the art. The valve structure may also be provided with any of various acceptable hydraulic, electrically or pneumatically driven operating devices for imparting rotation to the spherical plug of the valve within the spirit and scope of this invention.

As shown in FIG. 10, upper trunnion 20 preferably terminates in a portion of reduced diameter extending through top bearing housing 56. An upper trunnion thrust washer 56a is interposed between the trunnion 20 and bearing housing 56. A valve position pointer 56b is secured to trunnion 20 by a pin 56c. Pointer 56b rotates with trunnion 20 and indicates the position os plug member 22.

Figure 3:
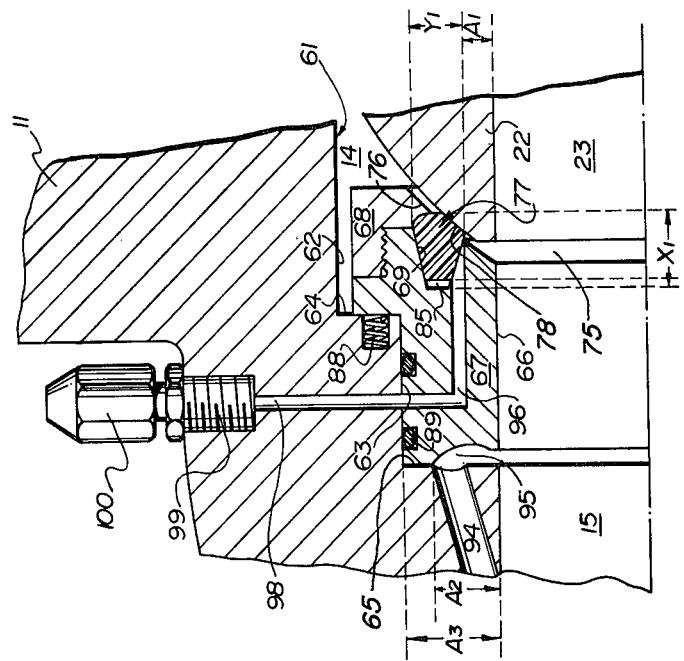
FIG. 3 is an enlarged section of a portion of the valve depicting the sealing assembly.
Figure 9:
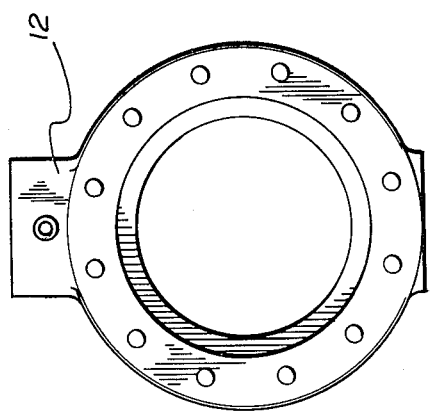
FIG. 9 is an elevation of one end of the central valve body member.

The preferred embodiment of this invention is provided with a novel seat assembly 66 as best illustrated in FIGS. 3 through 8. As is shown in FIGS. 2 and 3, each of the valve body end members 11 is provided with a stepped seat recess generally indicated at 61. Each seat recess 61 is formed by two cylindrical surfaces 62 and 63 and two radially extending annular planar shoulders 64 and 65. Each of the seat assemblies 66 comprises a seat ring 67 and a retainer ring 68 which fits over the seat ring 67 to define an annular seat groove 69 as illustrated in detail in FIG. 3.

Figure 5:
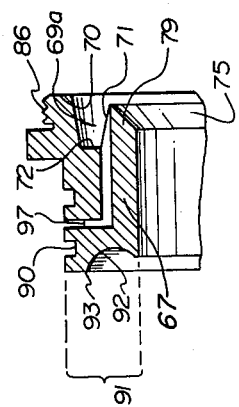
FIG. 5 is a median section of the seat ring of FIG. 4.
Figure 4:
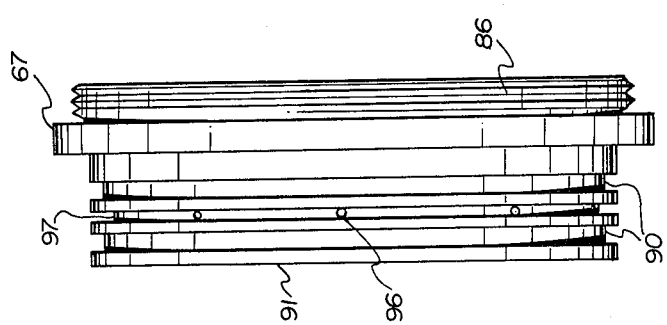
FIG. 4 is an elevation of the seat ring.

Referring particularly to FIGS. 3 and 5, the seat groove is formed, in part, by a seat ring groove 69a as shown in those figures. The seat ring groove is formed by frusto-conical surfaces 70 and 71, the two surfaces converging axially away from the spherical plug member 22, the surfaces being joined by an annular radially extending planar surface 72, forming the inner end of the seat ring groove.

Figure 8:
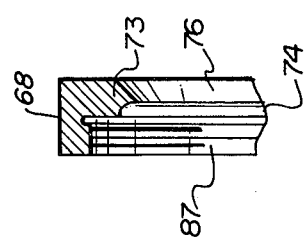
FIG. 8 is a median section of the retainer ring.

As shown in FIGS. 3 and 8, outer retainer ring 68 is provided with a radially inwardly extending lip 73 having an inner concavely curved annular surface 74 which cooperates with surfaces 70, 71 and 72 to define groove 69 with a restricted opening adjacent to the spherical plug member 22. The seat assembly is provided with a bevelled sealing face formed by a frusto-conical surface 76 on the retainer ring and a generally co-extensive frusto-conical surface 75 on the seat ring, each surface, as viewed in cross-section, being disposed generally parallel to a tangent to the spherical surface of the plug member 22.

An annular elastomeric sealing member 77 having a cross-sectional shape generally complimentary to the cross-sectional shape of the annular groove 69 is disposed within the groove 69 and has an annular sealing portion 78 thereof extending through the annular restricted opening defined by the inner and outer lips 73 and 79 of the retainer ring and seat ring, respectively.

Figure 7:
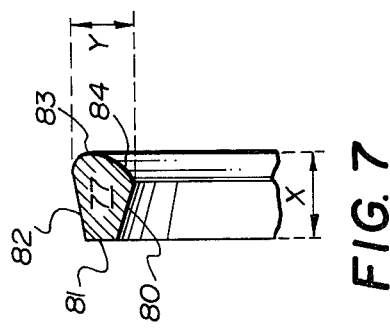
FIG. 7 is a median section of the sealing member of FIG. 6.
Figure 6:
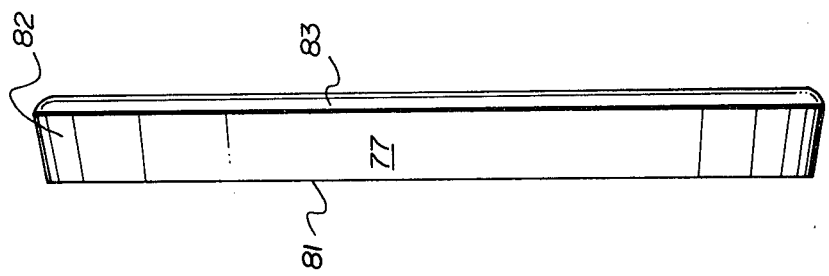
FIG. 6 is an elevation of the sealing member.

The sealing member 77 is best illustrated in FIGS. 6 and 7. As viewed in section, as best illustrated in FIG. 7, the sealing member 77 is bounded by three straight lines 80, 81 and 82, and two curved lines 83 and 84. Straight lines 80, 81 and 82 are parallel to corresponding lines 71, 72 and 70, respectively, of the seat groove, as shown in FIG. 5. Curved line 83 is parallel to curved line 74 as shown in FIGS. 3 and 8, while line 84, which delineates that portion of the surface of the sealing element 77 that protrudes through the aperture bounded by lips 73 and 79, has a slightly convex curvature.

In its uncompressed state, prior to insertion in the seat ring groove and subsequent application of the retainer ring, the axial length X of the sealing member 77 is substantially less than the axial length $X_1$ of the groove 69 as defined by the seat ring and the retainer ring, as shown in FIG. 3. Also in its uncompressed state, the radial thickness Y of the sealing member 77 is substantially greater that the corresponding radial thickness $Y_1$ of the groove 69. As a result of these dimensional characteristics, when the elastomeric sealing element 77 is inserted within the seat ring groove 69a and the retainer ring 68 is tightly applied to the seat ring, the sealing element is compressed by seat groove surfaces 70, 71 and 74. The major component of the compressional force exerted by surfaces 70 and 71 is radial, but because the surfaces are not parallel to the axis of the conduit, but are angled slightly with respect thereto (surface 71 may be angled at about 18° and surface 70 may be angled at about 10°), there is also a strong component of axial compression. The major component of the compression exerted by surface 74 is, of coure, axial, since this surface extends generally in a radial direction. Thus, sealing member 77 is tightly compressed, both radially and axially, against surfaces 70, 71 and 74. The compressional force increases towards the inner end of groove 69a because, although the absolute compression in terms of change of volume or thickness is constant, the percentage change in thickness or volume increases, thereby increasing the compressional forces. Because sealing member 77 is axially shorter than annular groove 69, an annular expansion space 85 remains after assembly of the sealing assembly 66, although the space is partially filled by distortion of the shape of the sealing member 77 under compression.

Surface 74 could be replaced by a combination of a cylindrical surface and a radially extending annular planar surface defining, in cross-section, a 90° corner rather than a curved line. The advantage of the curved surface 74, which is somewhat more difficult to machine than the said alternative configuration, is that it provides a more even distribution of pressure on the sealing member 77, and less distortion thereof under conditions of high pressure.

It is to be noted that, in the embodiment illustrated, retainer ring 68 is threadedly secured to seat ring 67 by means of co-operating threads 86 and 87 on the seat ring 67 and retainer ring 68, respectively. However, other means may be employed to secure the seat ring to the retainer ring, such as bolts or screws or by press fitting.

As shown in FIG. 3, in the valve as assembled, seat assembly 66 is biased against plug member 22 by a plurality of springs 88 disposed in recesses in shoulder 64, bringing sealing member 77 into sealing engagement with plug member 22.

A fluid-tight seal between the sealing assembly 66 and the valve body 11 is provided by o-rings 89 which are disposed within annular grooves 90 in seat ring 67. The end of seat ring 67 remote from plug member 22 terminates in a generally radially extending shoulder 91 which, in the preferred embodiment hereof as illustrated in the drawings, particularly FIG. 5, has an annular concavely curved portion 92 and an annular radially extending planar portion 93. The movement of the seat assembly in an axial direction away from plug member 22 is limited by the abutment of planar surface 93 against shoulder 65. Movement of the seat assembly 66 in an axial direction towards plug member 22 is limited by abutment of frusto-conical surfaces 75 and 76 against plug member 22 if and when sealing member 77 has been compressed to such an extent that it is disposed entirely within annular groove 69.

The position assumed by the seat assembly 66 is dependent upon the conditions of pressure and flow within the flow passages.

Each of the valve body end pieces 11 is provided with a plurality of conduits 94 extending from the interior surface of flow passage 15 to the surface of radial shoulder 65, and providing for fluid communication therebetween. The number of conduits 94 required in a particular end piece 11 increases with the size of the valve, but advantageously at least 12 such conduits are provided. It will be further noted that, because of the provision of curved surface 92 on shoulder 91, even with the seat ring 67 in contact with surface 65, there is an annular space 95 between seat assembly 66 and shoulder 65, which space is fluid communication with the interior of the flow passage.

The manner in which the sealing assembly effectively provides a seal between the flow passage and the portions of valve chamber 14 outside the flow passage, under various conditions of pressure and flow, will now be discussed.

With plug member 22 in the closed position and fluid in the flow passage, there will normally be a static pressure in the flow passage on the upstream side of the plug member 22 that exceeds the pressure in the region of valve chamber 14 outside the line of contact between sealing member 77 and plug member 22, which region will normally be at atmospheric pressure. The static pressure conditions that apply within the system will be discussed with particular reference to FIG. 3, in which $A_1$ represents the area, as projected onto a plane perpendicular to the longitudinal axis of the flow passge, of that portion of the downstream end of the seat assembly that is exposed to flow passage fluid pressure, $A_2$ represents the area, as similarly projected, of that portion of the upstream seat assembly that is exposed to flow passage pressure when the seat assembly is in contact with shoulder 65, and $A_3$ represents the area, as similarly projected, of the upstream end of the seat assembly that it is exposed to flow passage fluid pressure when the seat assembly is not in contact with shoulder 65. It will be seen from FIG. 3 that $A_2$ exceeds $A_1$, and $A_3$ exceeds $A_1$ by a still greater amount. This relationship also holds true on the downstream side of plug 22. It follows that on both the upstream and downstream sides of the valve, if flow passage pressure exceeds the pressure outside the line of sealing contact between sealing member 77 and plug member 22, this will always tend to bias the seat assembly against the plug member 22, bringing sealing member 77 into tightly compressed sealing engagement with plug member 22. This flow passage pressure biasing supplements the initial biasing provided by springs 88.

With plug member 22 in the fully open position, it is obvious that, on the upstream side of plug member 22, there will be a flow of fluid through conduits 94. Thus, there will bear upon shoulder 91 both the static pressure head of the flow passage fluid, and an additional force due to the velocity head of fluid impinging on surface 92 from conduit 94. These forces aid in biasing the seat assembly 66 against the plug member 22 and in providing an effective sealing contact therebetween. In addition, the turbulent action of the fluid flow within annular space 95 and within the space between shoulders 65 and 91, where the seat assembly is moved out of contact with shoulder 65, scours debris and other accumulated materials from the space between the sealing assembly and the valve body, thereby keeping the space clean and lengthening the operative life of the seal assembly. A common problem in valves of this type is the buildup of sludge or debris in the space between the seal assembly and the valve body, which sludge or debris can build up to such a degree that it interferes with axial movement of the seat assembly, thereby materially reducing or destroying its effectiveness. The conduits 94 of this invention deal with this problem in a new and improved manner. The action of the fluid flowing through the upstream conduits 94 is aided by the curved surface 92 which effectively directs the flow radially inwardly and imparts to the fluid a circulating motion, to provide a strong scouring action.

The conduits 94 of this invention would be useful for the purpose disclosed even in conjunction with other sealing assembly shoulder configurations than that described herein. Indeed, as will be obvious to one skilled in the art, the conduits 94 could be used in association with axially movable sealing assemblies in many types of valves, including gate valves.

On the downstream side of the plug member, with the plug member 22 in the open position, there will be a fluid flow into the space 95 and hence through conduits 94 and out into the main flow passage 15. This provides a cleaning and scouring action but does not provide any velocity head. However, there will be static fluid pressure within space 95 which will, as previously described, bias the downstream seat assembly against plug member 22. It will also be noted that the valve of this invention is reversible both with respect to direction of flow and with respect to position in the pipeline in which it is attached, so that the flow may be reversed within a particular valve, or, if desired, the valve may be reversed within a pipeline, so as to expose both seat assemblies to velocity head and scouring action provided by the upstream conduits 94.

Referring particularly to FIG. 3, the structure and function of sealing element 77 will now be described in further detail. Sealing element 77 is usually made of an elastomeric material. The particular material selected will depend chiefly upon the conditions under which the valve is intended to operate. For conditions of relatively low line pressure, rubber (buna-n) is suitable, as it is sufficiently flexible to provide good sealing contact with plug element 22 even at relatively low pressures. For higher pressure conditions, a relatively hard plastic, such as "NYLON"* or "TEFLON"* are preferred, as they have greater resistance to compression forces and shearing forces to which it is subjected under such conditions of high pressure. For high temperature and pressure conditions, bronzed "TEFLON"* may be used, and, in cases where metal-to-metal contact is desired, the sealing member may be made of metal. Of course a metal sealing member would have to be machined to fit groove 69, as it would not have the compressibility of an elastomeric member.

*Trade Marks

As has been decribed, when the flow passage pressure exceeds the pressure in valve chamber 14 outside the seal, the seat assembly 66 is urged against plug member 22. The resultant force acting on sealing element 77 can be considered as an outwardly directed force acting perpendicularly to the plug surface at the area of contact between sealing member 77 and plug member 22. The major component of that force is axial. In addition, there is a radial force acting directly on sealing member 77 through pressure of line fluids in the space between seat ring face 75 and plug member 22. Thus, the result of increased flow passage pressure is to force element 77 upwardly against surfaces 70 and 74 and axially against surfaces 70 and 71. Annular space 85 provides room for movement of sealing member 77 axially further into groove 69. The result of any such axially movement is increased sealing pressure along groove faces 70 and 71, thereby providing improved sealing contact. Even if radially directed flow passage pressure increases to the point that sealing contact along the outer part of surface 71 decreases or is lost, there will still be strong sealing contact along surfaces 74 and 69, and the rearward portion of surface 71, whereby an effective seal will be maintained.

It will be noted that the sealing face 84 of sealing member 77 is slightly convexly curved in order to provide an efficient pressure seal along plug member 22.

In the preferred embodiment of this invention as shown in the FIGURES, means is provided to introduce lubricant or sealant to the sealing surface, as and when required. Referred particularly to FIG. 3, seat ring 67 is provided with a plurality of lubricant passages 96. These passages are in communication with an annular chamber 97 formed around the circumference of seat ring 67, and isolated from the valve chamber 14 and the flow passage 15 by o-rings 89. Chamber 97 is in communication with passage 98 in valve body member 11. The outer extremity of passage 98 is threaded at 99 to receive an injection member 100. Passages 96 extend within seat member 67 to surface 71, as is best shown in FIG. 5. Under normal conditions, with sealing member 77 in contact with surface 71 throughout the extent thereof, injection of sealant or lubricant will be blocked by member 77. However, under conditions of extreme pressure, or where the configuration of member 77 has been altered by wear or the like, and there is no longer complete sealing contact between element 77 and surface 71, it will be possible, as and when required, to inject sealant or lubricant past element 77 and onto the working surface of plug member 22.

An additional feature of the valve disclosed herewith merits special comment. It will be noted that the valve body is comprised of three members, a central member 12 and two identical end members 11. The symmetry of the valve body and the identical construction of the end members makes it possible to interchange end members of different types to, in effect, obtain a different valve, all other components remaining the same. For example, with the same sealing assemblies, central body member 12, ball element 22, and so on, different types of body end members 11 may be used to provide for flanged, threaded or welded connections within a pipeline or other conduit, or to provide, for example, a venturi (reduced port) valve connection instead of a full opening valve connection. This element of interchangeability is another advantage of the valve of this invention.

It will be understood by those skilled in the art that many of the features of the valve described herein may be varied within the spirit and scope of this invention. For example, known seat assembly configurations may be used in place of the novel seat assembly described herein. Known means for limiting the rotation of the plug member may be used in place of the novel trunnion cap and stop member arrangement described herein. The valve body need not utilize the symmetrical three-piece construction described herein, but may utilize any other suitable construction known in the art. Many other variations are doubtless possible within the scope and spirit of this invention.

I claim:

1. A plug valve comprising:
   a. a valve body having a valve chamber and inlet and outlet flow passages disposed in fluid communication with said valve chamber;
   b. a plug member rotatably disposed within said valve chamber and having a flow passage extending through it for alignment with said inlet and outlet passages in the open position of said valve;
   c. means for imparting rotation to said plug member between the open and closed positions thereof;
   d. a seat recess formed in said valve body about at least one of said inlet and outlet flow passages and adjacent to said valve chamber, in axial alignment with said flow passage, the interior surface of said seat recess being joined to the interior surface of said flow passage by a generally radially extending shoulder surface;
   e. a seat assembly disposed in said recess and axially movable toward and away from said plug member, said seat assembly including a resilient sealing member disposed therein in sealing engagement with said plug member;
   f. means establishing a fluid-tight seal between said valve body and said seat assembly;
   g. means urging said seat assembly toward said plug member;
   h. the end of said seat assembly axially remote from said plug member terminating in a generally radially extending shoulder surface disposed adjacent to, and generally co-extensively with, said radially extending shoulder surface of said seat recess, whereby the motion of said seat assembly in an axial direction away from said plug member is limited;
   i. at least one fluid conduit extending through the valve body from the interior surface of said flow passage to the said radially extending shoulder surface of said seat recess, thereby providing means for fluid passage between the said surfaces; and
   j. means permitting fluid passage between said valve chamber and the outlet of said conduit on said radially extending surface of said seat recess.

2. The invention defined in claim 1, wherein at least twelve fluid conduits are provided.

3. The invention defined in claim 2 wherein all flow passages and fluid conduits are substantially circular in cross-section and the valve chamber and plug member are generally spherical in shape.

4. The invention defined in claim 2 wherein all flow passages and fluid conduits are substantially circular in cross-section and the valve chamber and plug member are generally spherical in shape, and further including a lubricant and sealant injection device carried by said valve body, first lubricant passage means formed in said valve body and being in fluid communication with said lubricant injection device, second lubricant passage means formed in said seat assembly and being in fluid communication with an annular groove, said means establishing seals between said seat ring assembly and said valve body defining a lubricant chamber and said first and second passages being in fluid communication with said lubricant chamber.

5. The invention defined in claim 1 wherein said plug member is supported within said valve chamber by upper and lower trunnions rotatably mounted within said valve body and fixedly mounted within said plug member, the lowermost end of the lower trunnion being mounted within a generally cylindrical trunnion cap, said cap having a central protruding portion extending into a recess in the valve body adapted to receive it in closely fitting relationship, said protruding portion being provided with a generally cylindrical recess for receiving the lower end of said trunnion, said cylindrical recess being provided with an inwardly projecting portion of smaller radius than the radius of the recess, said inwardly projecting portion co-operating with a recess of equal or slightly greater depth within the lower end of said trunnion, wherein the trunnion recess subtends, at the centre of the trunnion, an angle that is substantially 90° greater than the angle subtended at that point by said inwardly projecting portion of said cap, said cap and trunnion being mounted in interfitting relationship in such a position relative to the plug member as to limit its rotation to a range of substantially 90° between the open and closed positions of the valve.

6. The invention defined in claim 1 wherein the seat assembly comprises a seat ring, a retainer ring fitted about said seat ring and attached thereto and defining therewith an annular groove having a restricted annular opening, and an annular resilient sealing member disposed within said groove and having an annular sealing portion thereof protruding through said restricted opening in sealing engagement with said plug member.

7. The invention defined in claim 6 wherein a generally frusto-conical sealing surface adapted for sealing engagement with said plug member is formed on each of said seat ring and said retainer ring, said sealing surface of said seat ring being disposed radially inwardly of said sealing member and said sealing surface of said retainer ring being disposed radially outwardly of said sealing member.

8. The invention defined in claim 7 wherein the area of said annular generally radially extending shoulder surface of said seat assembly as projected onto a plane perpendicular to the axis of its associated flow passage substantially exceeds the similarly projected area of said frustoconical sealing surface of said seat ring.

9. The invention defined in claim 8 further including a lubricant and sealant injection device carried by said valve body, first lubricant passage means formed in said valve body and being in fluid communication with said lubricant injection device, second lubricant passage means formed in said seat ring and being in fluid communication with said annular groove, said means establishing seals between said seat ring and said valve body defining a lubricant chamber and said first and second passages being in fluid communication with said lubricant chamber.

10. The invention defined in claim 9, wherein at least twelve fluid conduits are provided.

11. The invention defined in claim 10 wherein:
the radially inner portion of the seat ring shoulder surface consists of a generally radially extending concavely curved annular surface providing a gap between said seat ring shoulder surface and said seat recess shoulder surface even when the radially outer portion of said seat ring shoulder surface abuts against said seat recess shoulder surface;
the conduits open onto said seat recess shoulder surface opposite said concavely curved surface; and
the area of said concavely curved annular surface as projected onto a plane perpendicular to the axis of its associated flow passage substantially exceeds the similarly projected area of said frusto-conical sealing surface of said ring.

12. The invention defined in claim 10 wherein all flow passages and fluid conduits are substantially circular in cross-section and the valve chamber and plug member are generally spherical in shape.

13. The invention defined in claim 10 wherein all flow passages and fluid conduit are substantially circular in cross-section.

14. The invention defined in claim 6 wherein:
said seat ring is provided with an annular recess extending axially therewithin for receiving said resilient sealing member, said recess being formed by a radially outer annular frusto-conical surface tapering inwardly away from the plug member and radially inner annual frusto-conical surface tapering inwardly toward said plug member, said surfaces terminating in an annular radially extending planar surface substantially perpendicular to the axis of the flow passage;
a generally frusto-conical sealing surface is formed on said seat ring and adapted for sealing engagement with said plug member;
an annular lip is formed on said seat ring by the intersection of said frusto-conical sealing surface and said radially inner annular frusto-conical surface of said annular recess, said retainer ring having an annular lip formed thereon co-operating with said seat ring lip to form said restricted opening at the outer extremity of said groove;
a concavely curved generally radially extending annular surface is formed on the side of said retainer ring lip remote from said plug member and provides one interior surface of said annular groove;
a generally frusto-conical sealing surface is formed on the other side of said retainer ring lip and is disposed generally co-extensively with said sealing surface of said seat ring;
said annular resilient sealing member disposed within said groove has a cross-sectional configuration generally corresponding to the cross-sectional configuration of said groove, said sealing member being provided with an annular sealing portion thereof protruding through said restricted opening in sealing engagement with said plug member, said sealing member being of lesser axial length than the axial length of said groove and of greater radial thickness than the radial thickness of said groove, whereby the frusto-conical surfaces of said groove and the annular concavely curved lip surface of said retainer ring maintain said sealing member under radial and axial compression and, at low pressures in the valve's pressure range, there is an annular space between the end of said sealing member remote from the plug member and the planar surface of said seat ring groove.

15. The invention defined in claim 14, wherein the area of said annular generally radially extending shoulder surface of said seat ring as projected onto a plane perpendicular to the axis of its associated flow passage substantially exceeds the similarly projected area of said frusto-conical sealing surface of said seat ring.

16. The invention defined in claim 15, further including a lubricant and sealant injection device carried by said valve body, first lubricant passage means formed in said valve body and being in fluid communication with said lubricant injection device, second lubricant passage means formed in said seat ring and being in fluid communication with said annular groove, said means establishing seals between said seat ring and said valve body defining a lubricant chamber and said first and second passages being in fluid communication with said lubricant chamber.

17. The invention defined in claim 16, wherein at least twelve fluid conduits are provided.

18. The invention defined in claim 17 wherein:
the radially inner portion of the seat ring shoulder surface consists of a generally radially extending concavely curved annular surface providing a gap between said seat ring shoulder surface and said seat recess shoulder surface even when the radially outer portion of said seat ring shoulder surface abuts against said seat recess shoulder surface;
the conduits open onto said seat recess shoulder surface opposite said concavely curved surface; and
the area of said concavely curved annular surface as projected onto a plane perpendicular to the axis of its associated flow passage substantially exceeds the similarly projected area of said frusto-conical sealing surface of said seat ring.

19. The invention defined in claim 17 wherein all flow passages and fluid conduits are substantially circular in cross-section and the valve chamber and plug member are generally spherical in shape.

20. The invention defined in claim 17 wherein all flow passages and fluid conduits are substantially circular in cross-section.

21. A plug valve comprising:
a. a valve body having a valve chamber and inlet and outlet flow passages disposed in fluid communication with said valve chamber;
b. a plug member rotatably disposed within said valve chamber and having a flow passage extending through it for alignment with said inlet and outlet passages in the open position of said valve;
c. means for imparting rotation to said plug member between the open and closed positions thereof;
d. a seat recess formed in said valve body about at least one of said inlet and outlet flow passages adjacent to said valve chamber, in axial alignment with said flow passage, the interior surface of said seat recess being joined to the interior surface of said flow passage by a generally radially extending shoulder surface;

e. a seat assembly disposed in said recess and axially movable toward and away from said plug member, said seat assembly including a resilient sealing member disposed therein in sealing engagement with said plug member;

f. means establishing a fluid-tight seal between said valve body and said seat assembly;

g. means urging said seat assembly toward said plug member;

h. the end of said seat assembly axially remote from said plug member terminating in a generally radially extending shoulder surface disposed adjacent to, and generally co-extensively with, said radially extending shoulder surface of said seat recess whereby the motion of said seat ring in an axial direction away from said plug member is limited;

i. at least one fluid conduit extending through the valve body from the interior surface of said flow passage to the said radially extending shoulder surface of said seat recess, thereby providing means for fluid passage between the said surfaces;

j. means permitting fluid passage between said valve chamber and the outlet of said conduit on said radially extending surface of said seat recess;

k. said plug member being supported within said valve chamber by upper and lower trunnions rotatably mounted within said valve body and fixedly mounted within said plug member, the lowermost end of the lower trunnion being mounted within a generally cylindrical trunnion cap, said cap having a central protruding portion extending into a recess in the valve body adapted to receive it in closely fitting relationship, said protruding portion being provided with a generally cylindrical recess for receiving the lower end of said trunnion, said cylindrical recess being provided with an inwardly projecting portion of smaller radius than the radius of the recess, said inwardly projecting portion co-operating with a recess of equal or slightly greater depth within the lower end of said trunnion, wherein the trunnion recess subtends, at the center of the trunnion, an angle that is substantially 90° greater than the angle subtended at the point by said inwardly projection portion of said cap, said cap and trunnion being mounted in interfitting relationship in such a position relative to the plug member as to limit its rotation to a range of substantially 90° between the open and closed positions of the valve.

22. The invention defined in claim 21 wherein all flow passages and fluid conduits are substantially circular in cross-section and the valve chamber and plug member are generally spherical in shape.

23. The invention defined in claim 21 wherein the seat assembly comprises a seat ring, a retainer ring fitted about said seat ring and attached thereto and defining therewith an annular groove having a restricted annular opening, and an annular resilient sealing member disposed within said groove and having an annular sealing portion thereof protruding through said restricted opening in sealing engagement with said plug member.

24. The invention defined in claim 23 wherein a generally frusto-conical sealing surface adapted for sealing engagement with said plug member is formed on each of said seat ring and said retainer ring, said sealing surface of said seat ring being disposed radially inwardly of said sealing member and said sealing surface of said retainer ring being disposed radially outwardly of said sealing member.

25. The invention defined in claim 24 wherein the radially inner portion of the seat assembly shoulder surface consists of a generally radially extending concavely curved annular surface providing a gap between said seat assembly shoulder surface and said flow passage shoulder surface even when the radially outer portion of said seat assembly shoulder surface abuts against said flow passage shoulder surface;

the conduits open onto said valve body shoulder surface opposite said concavely curved surface; and the area of said concavely annular surface as projected onto a plane perpendicular to the axis of its associated flow passage substantially exceeds the similarly projected area of said frusto-conical sealing surface of said seat ring.

26. The invention defined in claim 25 wherein at least twelve fluid conduits are provided and the valve chamber and plug member are generally spherical in shape.

27. The invention defined in claim 21 wherein all flow passages and fluid conduits are substantially circular in cross-section, and further including a lubricant and sealant injection device carried by said valve body, first lubricant passage means formed in said valve body and being in fluid communication with said lubricant injection device, second lubricant passage means formed in said seat ring and being in fluid communication with said annular groove, said means establishing seals between said seat ring and said valve body defining a lubricant chamber and said first and second passages being in fluid communication with said lubricant chamber.

28. A plug valve comprising:

a valve body having a generally spherical valve chamber and inlet and outlet flow passages of substantially circular cross-section disposed in fluid communication with said valve chamber;

a generally spherical plug member disposed within said valve chamber and having a flow passage of substantially circular cross-section extending through it for alignment with said inlet and outlet passages in the open position of said valve;

said plug member being supported within said valve chamber by upper and lower trunnions rotatably mounted within said valve body, each trunnion being fixedly mounted within said plug member by means of an interfitting engagement between a generally rectangular trunnion extension having a key projecting from one face thereof, said projection and key cooperatively interfitting within a correspondingly shaped depression within the plug member;

means for imparting rotation to said plug member between the open and closed positions thereof;

the lowermost end of the lower trunnion being mounted within a generally cylindrical trunnion cap, said cap having a central protruding portion extending into a recess in the valve body adapted to receive it in close fitting relationship, said protruding portion being provided with a generally cylindrical recess for receiving the lower end of said trunnion, said recess being provided with an inwardly projecting portion cooperating with a recess of equal or slightly greater depth within the lower end of said trunnion, wherein the trunnion recess subtends at the center of the trunnion an angle that is substantially 90° greater than the angle subtended at that point by said inwardly projecting portion of said cap, said cap projection and trunnion recess being mounted in interfitting relationship in such a position relative to the plug member as to limit its rotation to a range of 90° between the open and closed positions of said valve;

generally cylindrical seat recesses formed in said valve body about said inlet and outlet flow passages adjacent said valve chamber, in axial alignment with said flow passage, the interior surface of each seat recess being joined to the interior surface of its associated flow passage by a radially extending annular planar shoulder surface;

a seat assembly disposed in each said seat recess and axially movable toward and away from said plug member, said seat assembly comprising a seat ring, a retainer ring fitted about said seat ring attached thereto and defining therewith an annular groove having a restricted annular opening and an annular resilient face sealing member disposed within said groove and having an annular sealing portion thereof protruding through said restricted opening in sealing engagement with said plug member, said seat ring being provided with an annular recess extending axially therewithin for receiving said resilient sealing member, said recess being formed by a radially outer annular frusto-conical surface tapering inwardly away from the plug member and a radially inner annular frusto-conical surface tapering inwardly toward said plug member, said surfaces terminating in an annular radially extending planar surface substantially perpendicular to the axis of the flow passage;

means establishing a fluid-tight seal between said valve body and said seat ring;

means urging said seat ring toward said plug member;

a generally frusto-conical sealing surface formed on said seat ring and adapted for sealing engagement with said plug member, an annular lip formed on the said seat ring by the intersection of said frusto-conical sealing surface and said radially inner annular frusto-conical surface of said annular recess within said seat ring;

said retainer ring having an annular lip formed thereon co-operating with said seat ring lip to form said restricted opening at the outer extremity of said groove, a generally frusto-conical sealing surface formed on said retainer ring and disposed generally co-extensively with said sealing surface of said seat ring, said retainer ring being provided with a generally radially extending concavely curved annular surface intersecting said frusto-conical sealing surface of said retainer ring to define said annular lip, said concavely curved annular surface forming one interior surface of said annular groove;

said annular resilient face sealing member disposed within said groove having a cross-sectional configuration generally corresponding to the cross-sectional configuration of said groove, said sealing member being provided with a convexly curved annular surface protruding through said restricted opening at the outer extremity of said groove for engagement with the plug member, said sealing member being of lesser axial length than the axial length of said groove and of greater radial thickness than the radial thickness of said groove, whereby the frusto-conical surfaces of said groove and the annular curved surface of said retainer ring maintain said sealing member under radial and axial compression, and wherein, at low pressures in the valve's normal pressure range, there is an annular space between the end of said sealing member remote from the plug member and the planar surface of said seat ring groove;

a lubricant and sealant injection device carried by said valve body, first lubricant passage means formed in said valve body and being in fluid communication with said lubricant injection device, second lubricant passage means formed in said seat ring and being in fluid communication with said annular groove, said means establishing seals between said seat ring and said valve body defining a lubricant chamber and said first and second passages being in fluid communication with said lubricant chamber;

the end of said seat ring remote from said plug member terminating in an annular generally radially extending surface, the radially inner portion of said seat ring shoulder surface consisting of a generally radially extending concavely curved annular surface, said seat ring shoulder surface being disposed adjacent to said radially extending annular planar shoulder surface of said seat recess which is adapted to limit the motion of the sealing assembly in an axial direction away from the plug member, said concavely curved annular surface providing a gap between said seat ring shoulder surface and said seat recess shoulder surface even when the radially outer portion of said seat ring surface abuts against said seat recess shoulder surface;

the valve body being provided with at least twelve conduits extending through the valve body from the interior surface of the flow passage to the said seat recess shoulder surface opposite said concavely curved portion of the said corresponding generally radially extending surface of the seat ring, thereby providing means for fluid passage between the said surfaces and between said gap and the interior of said valve body, the area of said annular generally radially extending surface of said seat ring, and the area of the concavely curved portion thereof, as projected upon a plane perpendicular to the axis of the associated flow passage substantially exceeding the similarly projected area of said frusto-conical sealing surface of said seat ring.

* * * * *